US011773824B2

(12) United States Patent
Nielsen

(10) Patent No.: US 11,773,824 B2
(45) Date of Patent: Oct. 3, 2023

(54) METHOD OF MANUFACTURING A WIND TURBINE ROTOR BLADE

(71) Applicant: Siemens Gamesa Renewable Energy A/S, Brande (DK)

(72) Inventor: Mogens Nielsen, Aalborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/314,287

(22) Filed: May 7, 2021

(65) Prior Publication Data
US 2021/0348594 A1   Nov. 11, 2021

(30) Foreign Application Priority Data
May 11, 2020 (EP) .................................... 20173843

(51) Int. Cl.
*F03D 3/06* (2006.01)
*B29C 70/30* (2006.01)
(Continued)

(52) U.S. Cl.
CPC .......... *F03D 3/062* (2013.01); *B29C 33/3842* (2013.01); *B29C 70/302* (2021.05);
(Continued)

(58) Field of Classification Search
CPC ......... F03D 3/062; F03D 3/06; B29C 70/302; B29C 70/30; B29C 70/54; B29C 33/3842;
(Continued)

(56) References Cited

U.S. PATENT DOCUMENTS

| 10,640,197 B1 * | 5/2020 | Leuck .................. B29C 70/345 |
| 2015/0285217 A1 | 10/2015 | Liu et al. |
| 2017/0276117 A1 | 9/2017 | Church |

FOREIGN PATENT DOCUMENTS

| EP | 1805412 A1 | 7/2007 |
| EP | 2106900 A1 * | 10/2009 ......... B29C 33/0061 |

(Continued)

OTHER PUBLICATIONS

European Search Report and Written Opinion of the European Searching Authority dated Oct. 26, 2020 for Application No. 20173843.2.

*Primary Examiner* — Sabbir Hasan
*Assistant Examiner* — Joshua R Beebe
(74) *Attorney, Agent, or Firm* — Schmeiser, Olsen & Watts LLP

(57) ABSTRACT

Provided is a method of manufacturing a wind turbine rotor blade, which method includes the steps of preparing a mold by forming a partial negative leading-edge profile in a first mold half, which partial negative leading-edge profile includes a plurality of first indentations along a leading edge region of the first mold half; forming a partial negative leading-edge profile in a second mold half, which partial negative leading-edge profile includes a complementary plurality of second indentations along a leading edge region of the second mold half; and wherein the combined shape of a first indentation and a complementary second indentation corresponds to the negative shape of a leading-edge fin that will extend radially outward from the body of the rotor.

16 Claims, 5 Drawing Sheets

(51) Int. Cl.
  *B29C 33/38* (2006.01)
  *B29C 70/54* (2006.01)
  *B29L 31/08* (2006.01)

(52) U.S. Cl.
  CPC ......... *B29C 70/54* (2013.01); *B29L 2031/085* (2013.01); *F05B 2220/30* (2013.01); *F05B 2230/20* (2013.01)

(58) Field of Classification Search
  CPC ... B29C 33/38; F05B 2220/30; F05B 2230/20
  See application file for complete search history.

(56) References Cited

FOREIGN PATENT DOCUMENTS

| | | | | |
|---|---|---|---|---|
| EP | 2106900 | A1 | 10/2009 | |
| EP | 2466122 | A2 * | 6/2012 | ........... F03D 1/0675 |
| EP | 3822478 | A1 * | 5/2021 | ............. B29C 70/48 |
| EP | 3822478 | A1 | 5/2021 | |
| WO | WO 2006/042401 | | 4/2006 | |
| WO | WO 2006042401 | A1 | 4/2006 | |
| WO | WO-2007140771 | A1 * | 12/2007 | ........... F03D 1/0633 |
| WO | WO-2018149970 | A1 * | 8/2018 | ........... F03D 1/0675 |
| WO | WO-2019115372 | A1 * | 6/2019 | ........... F03D 1/0633 |
| WO | WO 2019115372 | A1 | 6/2019 | |

\* cited by examiner

METHOD OF MANUFACTURING A WIND TURBINE ROTOR BLADE

CROSS-REFERENCE TO RELATED APPLICATIONS

This application claims priority to European Application No. 20173843.2, having a filing date of May 11, 2020, the entire contents of which are hereby incorporated by reference.

FIELD OF TECHNOLOGY

The following describes a method of manufacturing a wind turbine rotor blade.

BACKGROUND

It is important to minimize the aerodynamic noise generated by the rotor blades of a wind turbine as they pass through the air. The addition of fins along the leading edge of a rotor blade has been shown to reduce aerodynamic noise. In this context, a fin shall be understood to be a curved part mounted over the leading edge, extending some distance into the suction side and pressure side of the rotor blade, and extending radially outward from the body of the rotor blade. A fin is preferably shaped so that a cross-section through it and the rotor blade would have the shape of an airfoil. The fins can be individually attached to the rotor blade body, or can be mounted on a curved carrier as part of a pre-assembled part that can be attached along the leading edge of a rotor blade.

Another reason for implementing such a finned leading edge profile is to protect the leading edge from impact damage. The force of impact by airborne particles of ice, sand, etc. travelling at a high relative velocity can lead to pitting, particularly along the leading edge of a rotor blade. Any such damage at the outer surface or skin of the rotor blade can be compounded later on, for example water may collect in the pits or scratches at the surface, and cracks may develop when the water expands as it freezes. Such faults in turn can lead to catastrophic damage in the event of a lightning strike to the rotor blade. The structural damage may be so severe that the rotor blade needs to be repaired. Such maintenance work results in downtime of the wind turbine and further reduces the annual energy output. Furthermore, pits or scratches in the otherwise smooth rotor blade will reduce the aerodynamic performance of the rotor blade, and may have a noticeable negative effect on the annual energy output of the wind turbine. A finned leading edge is more effective than a simple protective coating applied over the leading edge because the fins serve to minimize the surface area that is exposed to direct particle impact.

However, an adhesive layer or other attachment mode may deteriorate over time, so that fins or a carrier can partially or completely detach from the leading-edge of the rotor blade. Such failure can result in significant repair and maintenance costs. The aerodynamic rotor must be halted during a repair procedure, and this entails downtime and loss of revenue.

SUMMARY

An aspect relates to an improved way of providing leading-edge protection for a wind turbine rotor blade.

According to embodiments of the invention, the method comprises the steps of preparing a mold by forming a partial negative leading-edge profile in a first mold part, which partial negative leading-edge profile comprises a plurality of first indentations along a leading edge region of the first mold part; and also by forming a partial negative leading-edge profile in an second mold half, which partial negative leading-edge profile comprises a complementary plurality of second indentations along a leading edge region of the second mold half. The shape of a complete indentation comprising a first indentation and a complementary second indentation is the negative shape of a leading-edge fin that will extend radially outward from the body of the rotor blade. The method comprises carrying out a subsequent procedure to mold the rotor blade by performing a material layup procedure to arrange molding material in the mold, thereby arranging fin inserts in the indentations of a partial negative leading-edge profile, and subsequently performing a resin transfer procedure. After curing, the molded part—comprising a plurality of embedded fin inserts—can be removed from the mold.

An indentation or recess is shaped according to the desired shape of a fin that should extend from the rotor blade body. In the context of embodiments of the invention, it shall be understood that a second indentation or recess is a continuation of its complement.

The molding material that is used to form the body of the rotor blade may comprise any suitable arrangement of fiber material layers which can be provided in the form of mats, sheets, rovings, etc., and which are bonded by resin during the molding procedure. A commonly used fiber material is glass-fiber, which can be provided in many different forms which can be combined as desired. Some fraction of carbon fiber material may also be incorporated on account of the favorable qualities of carbon fiber reinforced material. The "material layup" can follow a pre-determined sequence with specific outer layers, intermediate layers, and inner layers. These and other aspects regarding material layup will be familiar to the skilled person and need not be elaborated upon herein.

An advantage of the inventive method is that a leading-edge protection (leading-edge) with an advantageous arrangement of outwardly projecting fins is incorporated in the body of the rotor blade during the molding procedure. The provision of this embedded finned leading-edge does not require a separate manufacturing step, in contrast to the conventional art approach of attaching fins to the outside of a rotor blade.

According to embodiments of the invention, the wind turbine rotor blade is manufactured using the inventive method and comprises an finned leading-edge incorporated in the body of the rotor blade by embedding during the molding procedure. The embedded leading-edge fins follow the curved shape of the rotor blade on either side of the leading edge, and extend radially outward from the rotor blade body.

An advantage of the inventive rotor blade is that the finned leading-edge is already incorporated in the body of the rotor blade, and does not need to be attached to the rotor blade in a separate manufacturing step. There is no adhesive layer that can deteriorate, and the finned leading-edge cannot detach from the rotor blade body.

According to embodiments of the invention, the mold for use in the manufacture of a wind turbine rotor blade comprises a first mold part shaped to form one side of the rotor blade, which first mold part comprises a partial negative leading-edge profile comprising a plurality of first indentations along a leading edge region. The mold further comprises an second mold half shaped to form the other side of the rotor blade, which second mold half comprises a complementary partial negative leading-edge profile comprising a plurality of second indentations along a leading edge region, and wherein the shape of a complete indentation comprising a first indentation and a complementary second indentation is the negative shape of an leading-edge fin that will extend radially outward from the body of the rotor blade. The airfoil shape of the mold (and the resulting molded rotor blade part) can be defined in terms of chord length, transverse, etc. The shape of a complete indentation effectively extends the chord length of the airfoil shape at that position.

The preparatory stage of forming the mold halves need only be done once. Thereafter, the mold can be used in the manufacture of any number of rotor blades, which then advantageously already incorporate a finned leading-edge.

Particularly advantageous embodiments and features of the invention are given by the dependent claims, as revealed in the following description. Features of different claim categories may be combined as appropriate to give further embodiments not described herein.

The mold halves can be formed to mold an entire rotor blade comprising a root region, a shoulder region, and an airfoil region. In the case of a very long rotor blade, it may be preferred to manufacture the different rotor blade regions separately, using appropriately shaped partial molds, and then to join the sections to give a complete rotor blade. In such an approach, each partial mold comprises appropriately-shaped upper and lower mold halves. In the following, any reference to a mold can refer to a complete mold (for a complete rotor blade) or a partial mold (for a rotor blade section).

Molding of a rotor blade is generally done by resin transfer molding (RTM), in which liquid resin is distributed in the fiber material layup and then allowed to cure, after which the cured part is removed from the mold. A preferred procedure is vacuum-assisted RTM (VARTM), in which distribution of the liquid resin through the material layers is done under vacuum, as will be known to the skilled person.

In one conventional art approach, rotor blade halves are molded separately and then joined by an adhesive bond between the outer faces of the molded halves. However, this approach requires several finishing steps to obtain a desired smooth outer surface, and the lifetime of the rotor blade depends to a large extent on the strength of the adhesive bond.

Therefore, in a particularly preferred embodiment of the invention, the method comprises a step of arranging the molding material in the first mold half; and then joining the mold parts to obtain a closed mold prior to performing a VARTM procedure. In such a preferred molding technique, the mold parts comprise connecting means to facilitate connection of the second "upper" mold half to the first "lower" mold half to form an air-tight seal prior to the VARTM procedure.

In the inventive method, the material layup procedure includes a step of arranging a fin insert into each indentation of the partial negative leading-edge profile of the first mold half. A fin insert is arc-shaped, since an leading-edge profile fin will extend over the curved regions on either side of the leading edge of the rotor blade.

The fins of the leading-edge profile of a rotor blade are preferably resilient so that the leading-edge profile endures throughout the lifetime of the rotor blade. Therefore, in a particularly preferred embodiment of the invention, a fin insert is made of a suitable material such as fiberglass rovings, polyurethane foam, polyethylene terephthalate foam, etc. Glass-fiber rovings are a favored choice since these can easily be cut and formed to fit into indentations of various sizes.

The size and shape of fins along the leading edge of a rotor blade can be chosen according to their positions along the rotor blade. For example, larger and/or more widely-spaced fins may be preferred in a region nearer the inner end of the airfoil portion, while smaller and/or more closely-spaced fins may be preferred in a region closer to the rotor blade tip. The indentations in the mold halves are formed accordingly.

In the technique described above, the fin inserts are placed sequentially (e.g. one after the other) into the indentations during the layup stage. In a preferred embodiment of the invention, the layup procedure can be made more cost-efficient be inserting multiple fin inserts simultaneously. To this end, in a particularly preferred embodiment of the invention, the method comprises a step of providing an insert body which comprises a carrier, and a series of fin inserts mounted on the carrier. The spacing between the fin inserts mounted on the carrier corresponds to the spacing between the indentations of the partial negative leading-edge profile of the first mold half, so that the insert body can be placed in one step during the layup procedure.

The finned leading-edge can be provided as a single insert body, or as a linear arrangement of a plurality of insert bodies. This approach is advantageous, since the leading edge of a rotor blade generally follows a curve, particularly approaching the tip region, and the mold must have a corresponding curved leading edge region. This approach may also be preferred when molding a rotor blade with an inherent degree of twist along its longitudinal axis (this shape can be used to avoid tower collisions during operation), since the leading edge of such a rotor blade (in a resting state) does not follow a straight line. The insert bodies of the finned leading-edge can each be short, straight sections that collectively form a long, curved finned leading-edge.

In a preferred embodiment of the invention, the negative leading-edge profile of a mold part is formed as a removable insert, and a mold part is formed to comprise a complementary cut-out that is shaped to receive a mold insert. With this approach, one mold can be used in conjunction with any number of different mold inserts. The only requirement is that the mold insert can be placed into the mold cut-out. In a preferred embodiment of the invention, a mold assembly is provided, comprising such a mold and several mold inserts, wherein the mold inserts are formed to have different negative leading-edge profiles.

The dimensions of a negative leading-edge profile of a mold insert can be chosen on the basis of weather conditions at an intended wind turbine installation site. For example, a rotor blade for a wind turbine at a site with relatively clement weather conditions may benefit from relatively small and widely-spaced fins, while a rotor blade for a wind turbine at a site with relatively severe weather conditions (sand impact, hail impact, ice particle impact) may benefit from relatively high and closely-spaced fins.

BRIEF DESCRIPTION

Some of the embodiments will be described in detail, with references to the following Figures, wherein like designations denote like members, wherein.

Figure 3:
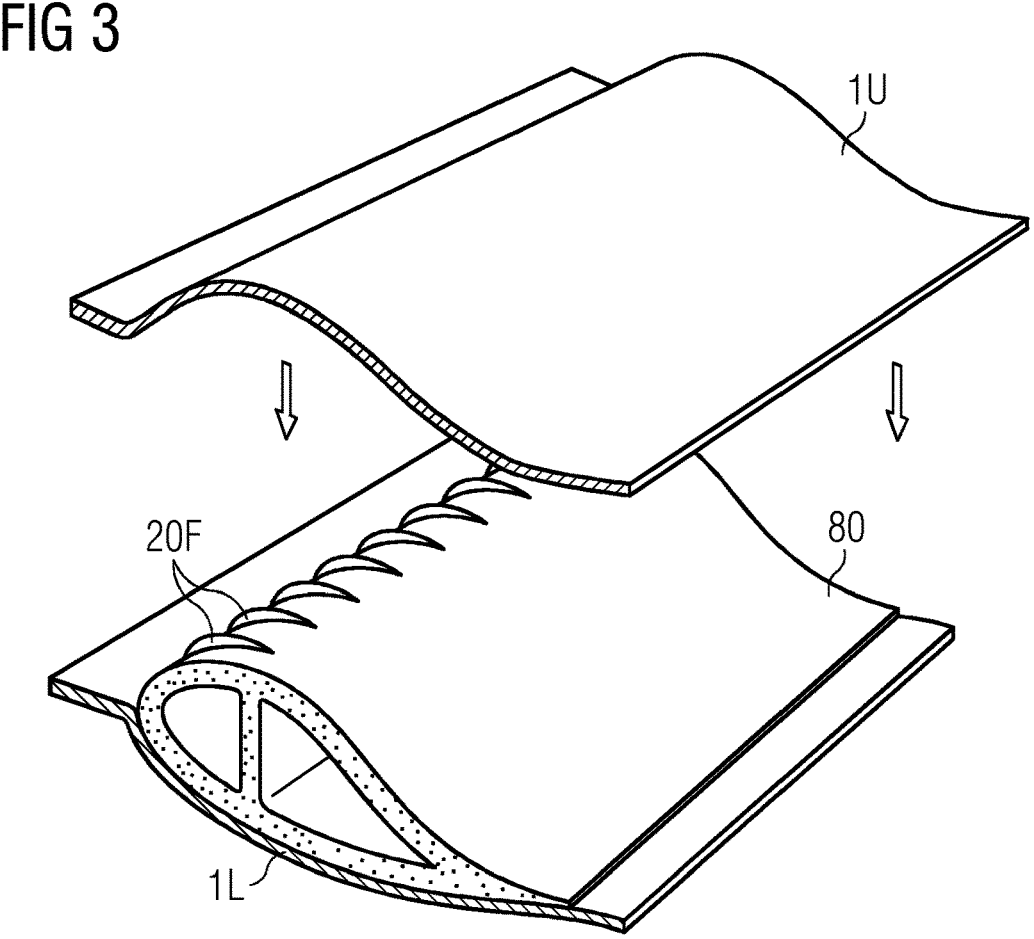
Figure 4:
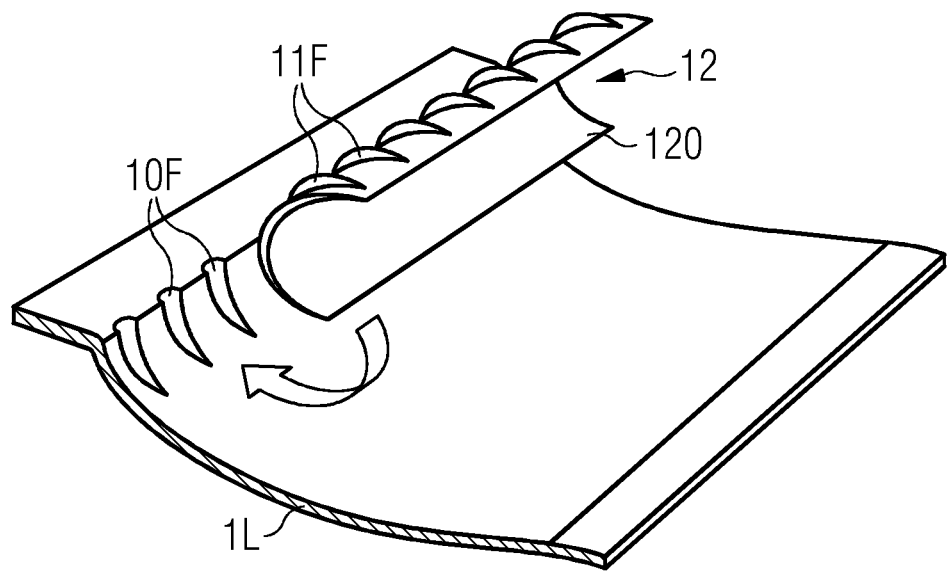
Figure 5:
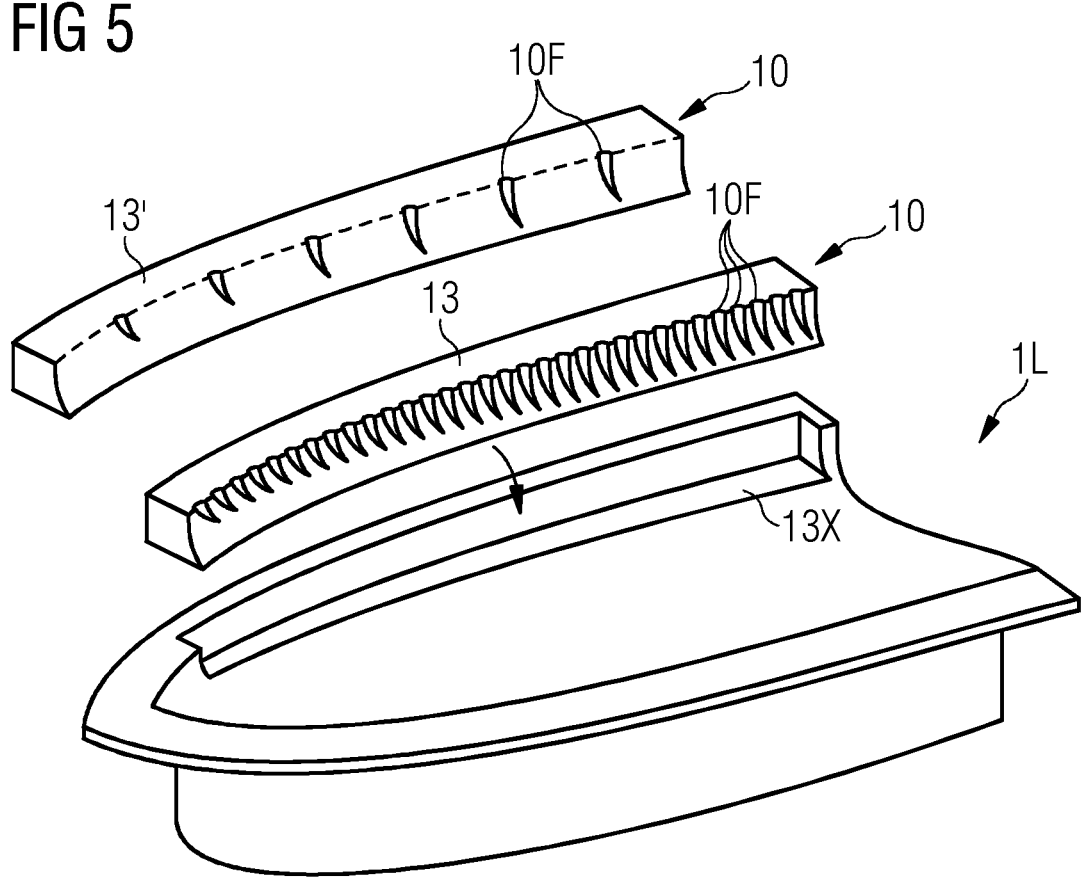
Figure 6:
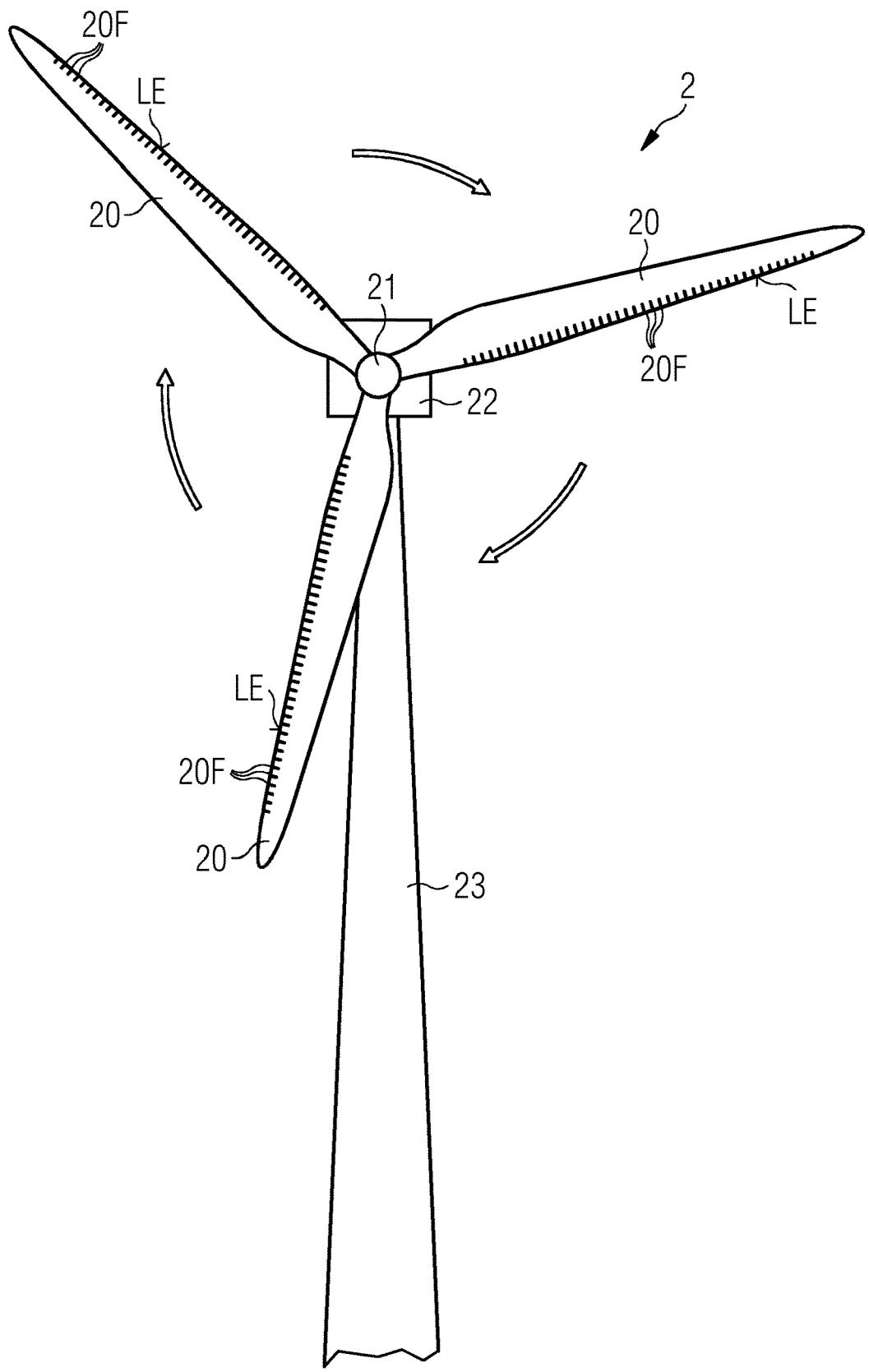
Figure 7:
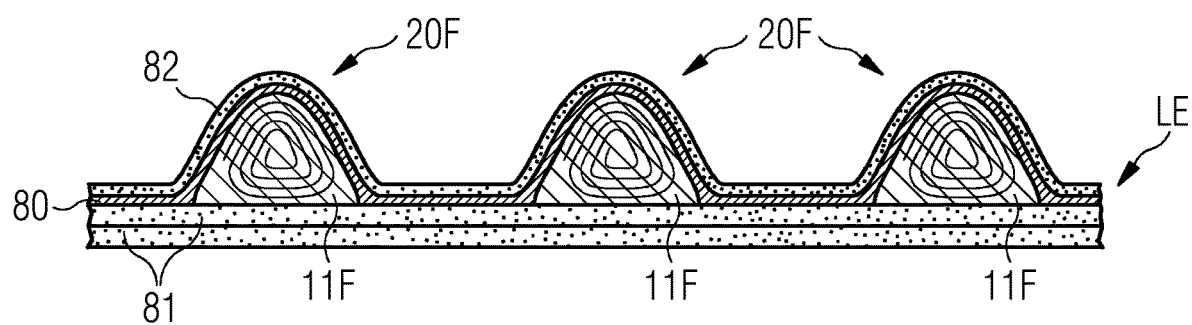
Figure 8:
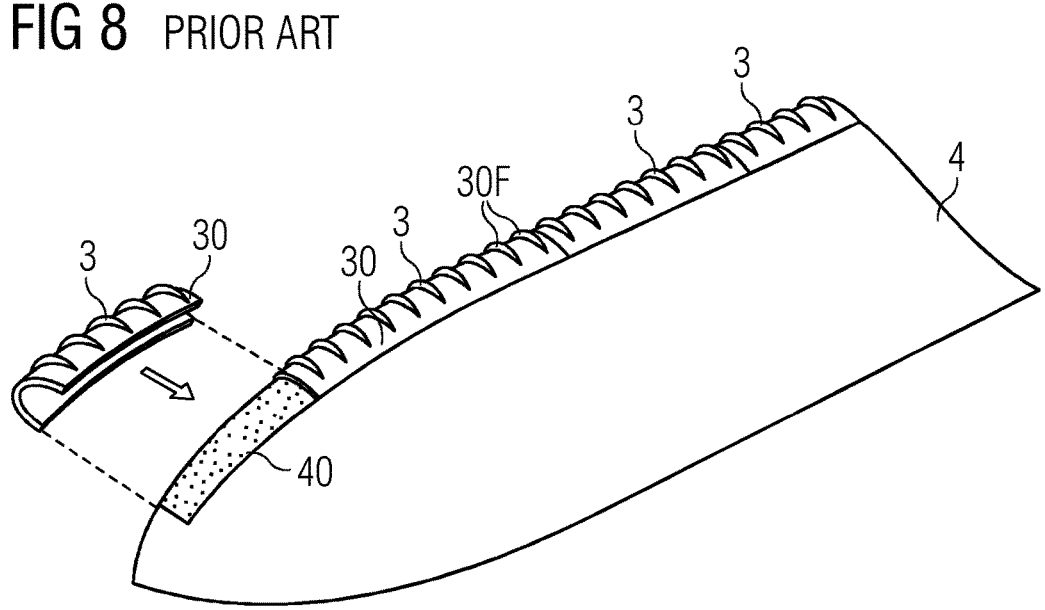

FIG. 3 illustrates stages of the inventive method;
FIG. 4 illustrate a stage of the inventive method;
FIG. 5 shows a further embodiment of the inventive mold;
FIG. 6 shows an embodiment of a wind turbine comprising a number of rotor blades manufactured using the inventive method;
FIG. 7 shows a cross-section through a rotor blade manufactured using the inventive method; and
FIG. 8 shows a rotor blade with a conventional leading-edge.

DETAILED DESCRIPTION

Figure 1:
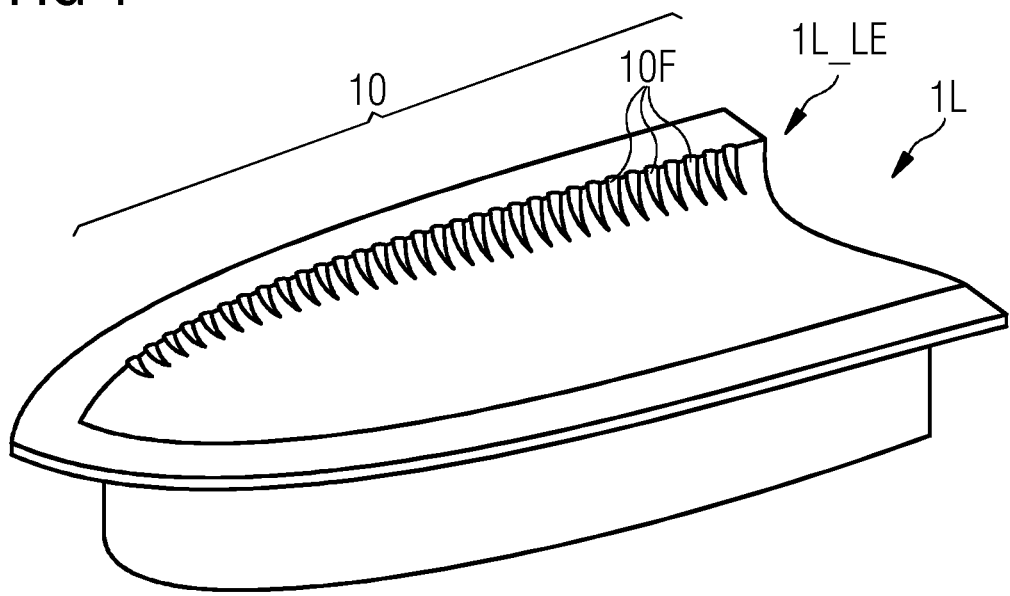
FIG. 1 shows an embodiment of a part of the inventive mold.

FIG. 1 shows a first mold half 1L of a closed mold assembly. The shape of the first mold half 1L determines the shape of one side of a rotor blade. Fiber layers will be arranged in the mold as will be known to the skilled person. A second mold half (not shown) will be secured to the first mold half to form an air-tight connection prior to a VARTM procedure.

In this exemplary embodiment, the mold part is prepared to have a series of indentations 10F along the region 1L_LE that will shape the leading edge of the rotor blade. The shape of each indentation 10F defines the shape of a fin to be formed at the leading edge.

Figure 2:
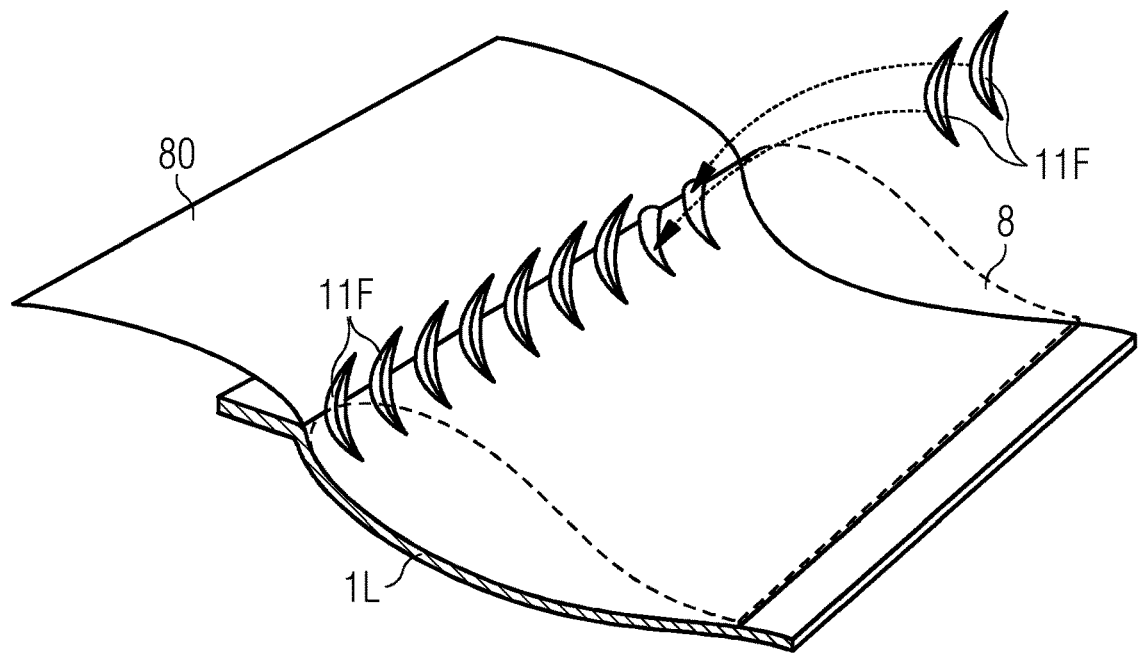
FIG. 2 illustrates stages of the inventive method.

FIG. 2 illustrates a stage during the material layup procedure in a preferred embodiment of the invention. A cover sheet 80 of a material such as an elastomer is arranged to line the lower mold 1L so that half of the sheet lies outside the lower mold 1L.

Fin inserts 11F are then placed into the indentations 10F of the first mold half 1L, which are already lined by the flexible cover sheet 80. The lower portion of each fin insert 11F fills an indentation 10F of the lower mold 1L, and the upper portion of the fin insert 11F rests against outer layers of the remainder of the layup 8. The cover sheet 80 is then drawn over to cover the entire layup 8. The second mold half 1U is then placed over the first mold half 1L in preparation for the VARTM procedure, as shown in FIG. 3.

After resin transfer and curing, the second mold half 1U is detached to reveal the rotor blade. The rotor blade 20 incorporates a finned leading-edge protection, with embedded fins 20F extending radially outward from the body of the rotor blade 20. The elastomer cover sheet 80 covers the entire molded part 20.

FIG. 4 shows an alternative embodiment of the inventive method. Here, an insert body 12 is provided with fin inserts 11F pre-mounted onto a carrier 12. The entire carrier 12 can be placed into the first mold half 1L after arranging a cover sheet 80 (as explained above) into the first mold half to line the mold and the indentations 10F.

FIG. 5 shows a further embodiment of the inventive mold. Here, a first mold half 1L is shown to have a cut-out 13X which can receive a mold insert 13, 13'. A mold insert 13, 13' is formed with a negative leading-edge profile 10, with indentations 10F as described above, and each mold insert 13, 13' can have a different arrangement of indentations (different indentation sizes, density, etc.); each mold insert 13, 13' has the same basic shape so that it fits into the mold cut-out 13X.

FIG. 6 shows a wind turbine 2 comprising a number of rotor blades 20 that have been molded using the inventive method as described above. Each rotor blade 20 has a series of fins 20F extending across its leading edge LE. One end of a fin 20F extends over the pressure side in the direction of the trailing edge, and the other end of the fin 20F extends over the suction side in the direction of the trailing edge. The finned leading-edge profile can have been formed by placing individual fin inserts 11F into the indentations 10F of a mold 1 as described above. Equally, the finned leading-edge profile can have been formed by placing one or more carrier inserts 12 into the first mold half as described above. In either case, the finned leading-edge profile is formed during the molding procedure and is therefore an integral part of the rotor blade 20. This embedded finned leading-edge profile is therefore not at risk of detaching from the body of the rotor blade.

FIG. 7 shows a cross-section through the leading edge of a rotor blade manufactured using the inventive method. The drawing shows several embedded fins 20F, formed by arranging fin inserts 11F in the form of twisted rovings into the corresponding indentations of the rotor blade mold halves. The fin inserts 11F are arranged to lie against other layers of fiber-reinforced material, for example fiberglass mats 81, which can be arranged in the mold in a layup procedure that will be known to the skilled person. The drawing also indicates a cover mat 80 that can be made of a suitably flexible elastomer that stretches over the fin inserts 11F during the VARTM process. After removing the cured rotor blade part from the mold, a protective top-coat 82 can be applied over the entire surface.

FIG. 8 shows a rotor blade 4 augmented in a conventional art method in which finned profiles 30 are mounted onto the leading edge of the rotor blade 4 using adhesive 40. The profiles 30 have outwardly extending fins 3 that serve to reduce noise and/or to minimize impact damage of the leading edge protection. The adhesive 40 may deteriorate over time, so that one or more finned profiles 30 may detach from the rotor blade, leading to maintenance costs and loss of revenue from forced downtime.

Although the present invention has been disclosed in the form of preferred embodiments and variations thereon, it will be understood that numerous additional modifications and variations could be made thereto without departing from the scope of the invention. For example, components of a de-icing system can be incorporated during the material layup procedure by arranging one or more heating mats in the leading edge region. The heating mats can be thin and flexible and are preferably arranged so that these will lie over the fins in the finished rotor blade. The heating mats are deployed to prevent build-up of ice on the leading edge of the rotor blade. A heating mat can incorporate electrically conductive elements such as thin copper wires, carbon fibers, etc. as will be known to the skilled person.

For the sake of clarity, it is to be understood that the use of "a" or "an" throughout this application does not exclude a plurality, and "comprising" does not exclude other steps or elements.

The invention claimed is:
1. A method of manufacturing a wind turbine rotor blade, the method comprising:
preparing a mold by:
forming a partial negative leading-edge profile in a first mold half by creating, a plurality of first indentations into a mold surface of the first mold half along a leading edge region of the first mold half;
forming a partial negative leading-edge profile in a second mold half by creating a complementary plurality of second indentations into a mold surface of the second mold half along a leading edge region of the second mold half, wherein the mold surface of the first mold half and the second mold half forms a shape of the wind turbine blade and a combined shape of a first indentation in the mold surface of the first mold half and a complementary second indentation in the mold surface of the second mold half corresponds to a negative shape of a leading-edge fin that will extend radially outward from a body of the wind turbine rotor blade; and molding the rotor blade by:
- laying molding material in the mold parts;
- arranging fin inserts in the first plurality of indentations of the partial negative leading-edge profile of the first mold half;
- joining the first mold half and the second mold half to form a closed mold such that a first portion of a fin insert is received within an indentation of the first mold half and a second portion of the fin insert is received within a complementary indentation of the second mold half; and
- performing a resin transfer procedure.

2. The method according to claim 1, wherein the step of arranging fin inserts in the indentations is preceded by a step of lining the first mold half with a cover sheet, wherein an area of the cover sheet is as least as large as an area of the part to be molded;

and wherein the step of arranging fin inserts in the indentations is followed by a concluding step of arranging the cover sheet over the material layup in the first mold half.

3. The method according to claim 1, wherein a fin insert comprises an arcuate body shaped to extend across the leading edge of the rotor blade.

4. The method according to claim 1, wherein a fin insert is made from any of: fiberglass rovings, polyurethane foam, polyethylene terephthalate foam.

5. The method according to claim 1, comprising a step of providing an insert body comprising a plurality of fin inserts mounted on a carrier and arranging the insert body in the first mold half such that the fin inserts are received by the partial negative leading-edge profile of the first mold half.

6. The method according to claim 1, wherein molding the rotor blade is done by:
- arranging the molding material in the first mold half; and
- joining the mold parts to obtain the closed mold prior to performing the resin transfer procedure.

7. The method according to claim 1, wherein the mold surface of the first mold half and the mold surface of the second mold half are each continuous mold surfaces.

8. A mold for use in the manufacture of a wind turbine rotor blade, comprising a first mold half having a mold surface shaped to form one side of the rotor blade, the first mold half comprising a partial negative leading-edge profile comprising a plurality of first indentations formed into the mold surface along a leading edge region; and a second mold half having a mold surface shaped to form the other side of the rotor blade, the second mold half comprising a complementary partial negative leading-edge profile comprising a plurality of second indentations formed into the mold surface along a leading edge region;

wherein, when the first mold half is joined with the second mold half to form the mold, the mold surface of the first mold half and the second mold half forms a shape of the wind turbine blade and a combined shape of a first indentation in the mold surface of the first mold half and a complementary second indentation in the mold surface of the second mold half corresponds to a negative shape of a leading-edge fin that will extend radially outward from a body of the wind turbine rotor blade.

9. The mold according to claim 8, wherein the negative leading-edge profile of a mold part is formed as a mold insert, and wherein a mold part is formed to comprise a complementary cut-out shaped to receive the mold insert.

10. A mold assembly comprising:
- the mold according to claim 9 for use in the manufacture of a number of wind turbine rotor blades; and
- a plurality of mold inserts, wherein the mold inserts are formed to have different negative leading-edge profiles.

11. The mold assembly according to claim 10, wherein the dimensions of a negative leading-edge profile of a mold insert are chosen on the basis of weather conditions at an intended wind turbine installation site.

12. The mold assembly according to claim 10, wherein the mold parts comprise connecting means to facilitate connection of the second mold half to the first mold half prior to a resin transfer procedure.

13. The mold according to claim 8, wherein the first plurality of indentations are adjacent to the second plurality of indentations when the first mold half is joined with the second mold half.

14. The mold according to claim 8, wherein the mold surface of the first mold half and the mold surface of the second mold half are each continuous mold surfaces.

15. A wind turbine rotor blade comprising: a plurality of embedded leading-edge fins extending across the leading edge of the rotor blade and extending radially outward from the body of the rotor blade, and a cover sheet disposed over the plurality of embedded leading-edge fins, wherein the plurality of embedded leading-edge fins were embedded using the mold of claim 8.

16. The wind turbine rotor blade according to claim 15, further comprising a linear arrangement of a plurality of embedded insert bodies carrying fin inserts to form the plurality of leading-edge fins.

* * * * *